(12) United States Patent
Sato

(10) Patent No.: US 6,230,606 B1
(45) Date of Patent: May 15, 2001

(54) SPEED CONTROL APPARATUS FOR CYLINDER

(75) Inventor: Akio Sato, Soka (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/300,449

(22) Filed: Apr. 28, 1999

(30) Foreign Application Priority Data

May 15, 1998 (JP) .................................................. 10-134072

(51) Int. Cl.[7] .................................................. F16K 31/00
(52) U.S. Cl. .................................................. 91/361; 251/129.06
(58) Field of Search ........................... 91/361, 419, 459, 91/462, 404, 405, 407, DIG. 2; 92/164; 251/129.2, 129.09, 250, 129.06, 122

(56) References Cited

U.S. PATENT DOCUMENTS

| | | | |
|---|---|---|---|
| 3,202,060 | * | 8/1965 | Grotness .............................. 92/164 X |
| 4,647,013 | * | 3/1987 | Giachino et al. ............ 251/129.06 X |
| 4,650,159 | * | 3/1987 | Shimamura .................. 251/129.11 X |
| 4,695,034 | * | 9/1987 | Shimizu et al. ................. 251/129.06 |
| 4,723,754 | * | 2/1988 | Torimoto et al. ............. 251/129.2 X |
| 4,889,036 | * | 12/1989 | Yshikawa et al. .................. 91/404 X |
| 4,932,311 | * | 6/1990 | Mibu et al. ......................... 91/404 X |
| 4,964,612 | * | 10/1990 | Aggioni et al. ................. 251/129.09 |
| 5,347,914 | * | 9/1994 | Kinoshita et al. ................. 91/459 X |
| 5,785,295 | * | 7/1998 | Tsai ................................. 251/129.06 X |
| 5,810,325 | * | 9/1998 | Carr ............................. 251/129.06 X |
| 5,844,390 | * | 12/1998 | Cameron ............................ 91/361 X |
| 5,893,428 | * | 4/1999 | Fasse et al. .................. 91/DIG. 2 X |
| 6,062,532 | * | 5/2000 | Gurich et al. ............... 251/129.06 X |

FOREIGN PATENT DOCUMENTS

| | | | |
|---|---|---|---|
| 2908583 | * | 9/1980 | (DE) ...................................... 91/405 |
| 63-176801 | * | 7/1988 | (JP) ....................................... 91/405 |

* cited by examiner

*Primary Examiner*—John E. Ryznic
(74) *Attorney, Agent, or Firm*—Oblon, Spivak, McClelland, Maier & Neustadt, P.C.

(57) ABSTRACT

A speed control apparatus for a cylinder comprises the cylinder, speed controllers for controlling flow rates of a pressure fluid introduced into and discharged from cylinder chambers, a controller for outputting control signals to the speed controllers, and a sensor for detecting the displacement amount of a piston of the cylinder to transmit a detection signal to the controller. Each of the speed controllers includes a throttle section for controlling the flow rate of the pressure fluid flowing through the fluid passage, and a throttle amount control section for changing the throttle amount at the throttle section on the basis of the control signal transmitted from the controller.

12 Claims, 12 Drawing Sheets

SPEED CONTROL APPARATUS FOR CYLINDER

BACKGROUND OF THE INVENTION

1. Field of the Invention

The present invention relates to a speed control apparatus for a cylinder, which makes it possible to automatically control the displacement speed of a piston by the aid of a speed controller for electrically controlling the flow rate of a pressure fluid introduced into and discharged from the cylinder.

2. Description of the Related Art

The pressure fluid-driven apparatus has been hitherto utilized extensively in order to drive and control the object by using a pressure fluid such as compressed air. FIG. 13 illustrates such a pressure fluid-driven apparatus as exemplified by a speed control circuit for controlling the operation speed of a cylinder.

The speed control circuit 1 comprises the cylinder 2, a selector valve 5 for making change over between a first port 4a and a second port 4b of the cylinder 2 for the pressure fluid supplied from a pressure fluid supply source 3, and a pair of speed controllers 6a, 6b installed to the pair of ports 4a, 4b of the cylinder 2 respectively.

In this case, the pressure fluid, which is supplied from the pressure fluid supply source 3, is supplied to the first or second port 4a (4b) of the cylinder 2 via the first or second speed controller 6a (6b) in accordance with the change over action of the selector valve 5. A piston 7, which is accommodated in a cylinder chamber of the cylinder 2, makes reciprocating motion at a predetermined speed in accordance with the action of the pressure fluid. Each of the speed controllers 6a, 6b generally comprises a variable throttle valve 8 and a check valve 9 which are combined in parallel in an integrated manner. The variable throttle valve 8 has an unillustrated valve stem formed with a knob (not shown) exposed to the outside. When an operator grips the knob to rotate the valve stem in a predetermined direction, the spacing distance (throttle amount) between the valve stem and a seat section is adjusted. As a result, the passage area at the inside of the valve is changed depending on the spacing distance between the valve stem and the seat section, and thus the flow rate of the pressure fluid, which is supplied to or discharged from the cylinder 2, is controlled.

However, the speed control circuit 1 for the cylinder 2 concerning the conventional technique involves the following drawback. That is, for example, every time when the operation speed of the cylinder 2 is changed due to any variation of the supply pressure of the pressure fluid supply source 3 or the like, the operator has to adjust the spacing distance (throttle amount) between the valve stem and the seat section by manually rotating the knob of each of the speed controllers 6a, 6b in the predetermined direction. The conventional speed control circuit 1 does not constructed such that the operation speed of the cylinder 2 is automatically controlled.

Further, for example, when the operation speed of the cylinder 2 is adjusted during the maintenance, the operator manually set or adjust the throttle amounts of a large number of speed controllers individually. Therefore, the conventional technique is complicated, and it involves such an inconvenience that the maintenance operation cannot be performed conveniently.

SUMMARY OF THE INVENTION

A general object of the present invention is to provide a speed control apparatus for a cylinder, which makes it possible to automatically control the operation speed of the cylinder.

A principal object of the present invention is to provide a speed control apparatus for a cylinder, which makes It possible to simplify the maintenance operation and collectively adjust the throttle amounts of a large number of speed controllers by means of remote control.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
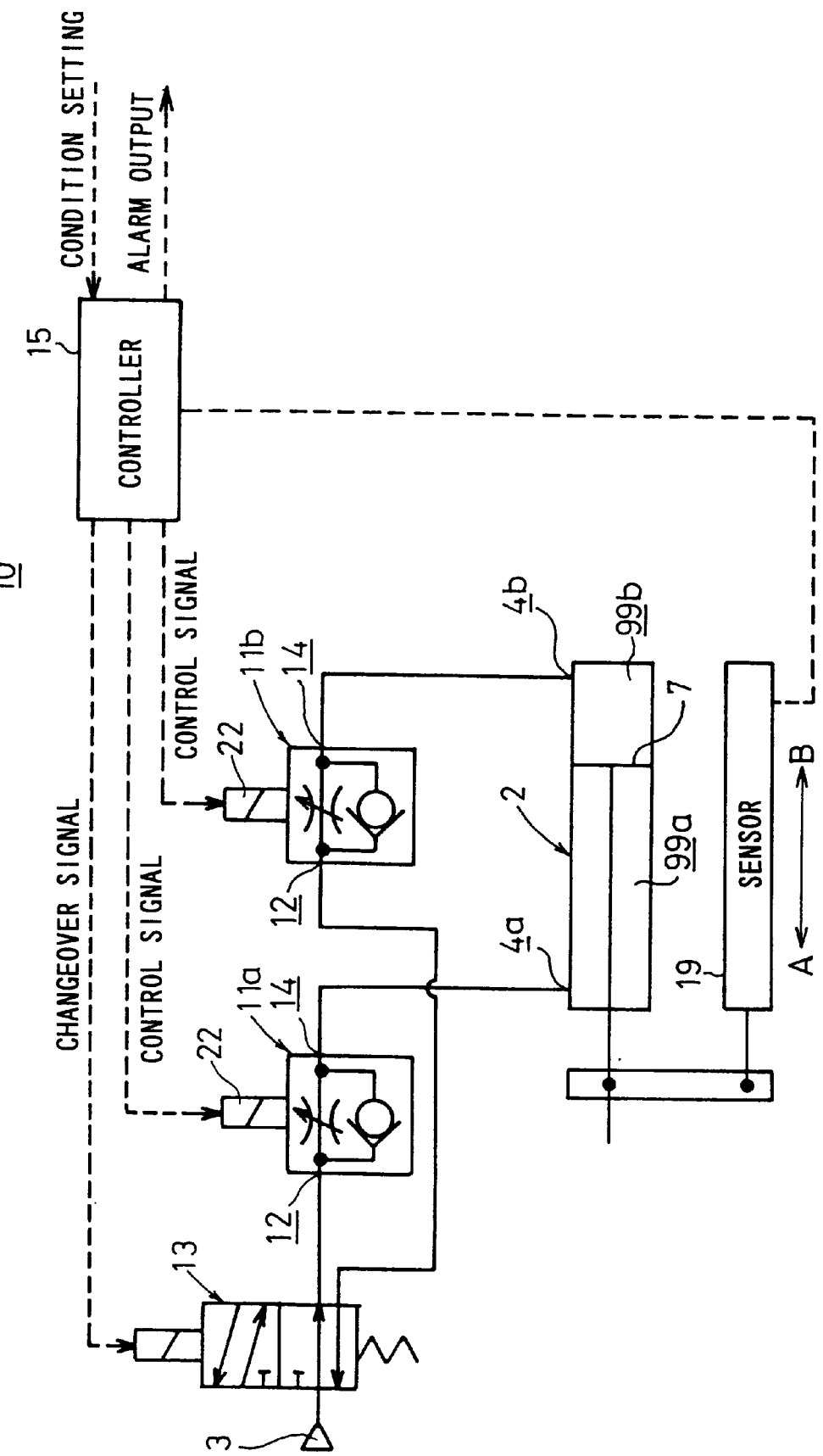
FIG. 1 shows a schematic circuit diagram of a speed control apparatus for a cylinder according to an embodiment of the present invention.
Figure 13:
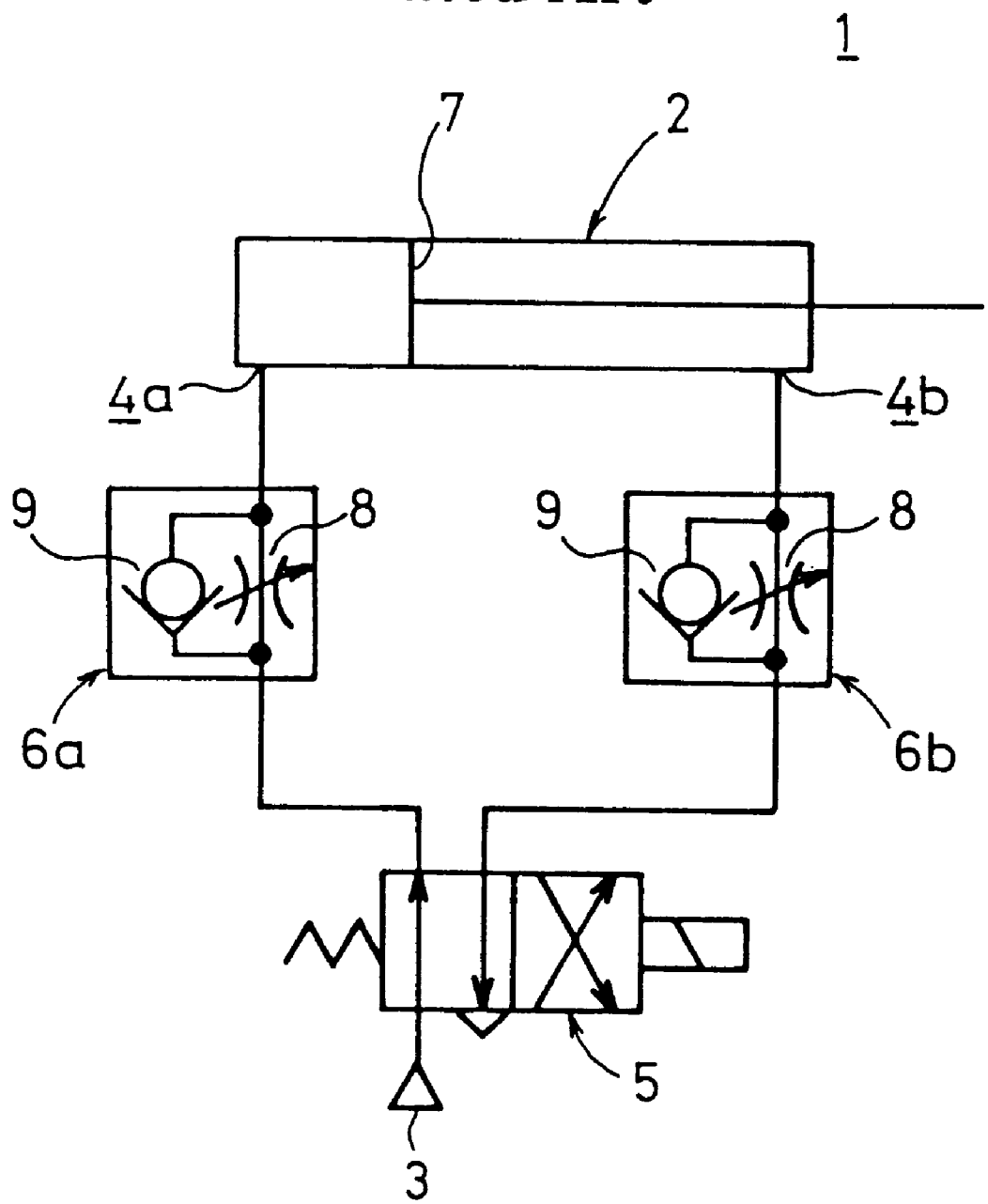
FIG. 13 shows an arrangement of a speed control circuit for illustrating the speed control apparatus for the cylinder concerning the conventional technique.

With reference to FIG. 1, reference numeral 10 indicates a speed control apparatus for a cylinder according to an embodiment of the present invention. The same constitutive elements as those of the speed control apparatus 1 concerning the conventional technique shown in FIG. 13 are designated by the same reference numerals, detailed explanation of which will be omitted.

The speed control apparatus 10 for the cylinder comprises the cylinder 2, a first speed controller 11a and a second speed controller 11b which are composed of identical constitutive elements and which are installed to a pair of ports 4a, 4b of the cylinder 2 respectively, a selector valve 13 which is interposed between a pressure fluid supply source 3 and the first and second speed controllers 11a, 11b, a controller 15 which is electrically connected to the first speed controller 11a, the second speed controller 11b, and the selector valve 13 respectively, for feeding control signals to the first speed controller 11a, the second speed controller 11b, and the selector valve 13, and a sensor 19 for detecting the displacement amount of a piston 7 accommodated in the cylinder 2 to feed an obtained detection signal to the controller 15.

The sensor 19 is composed of, for example, a potentiometer or a linear encoder, and the signal is transmitted as an analog or digital detection signal to the controller 15.

Figure 3:
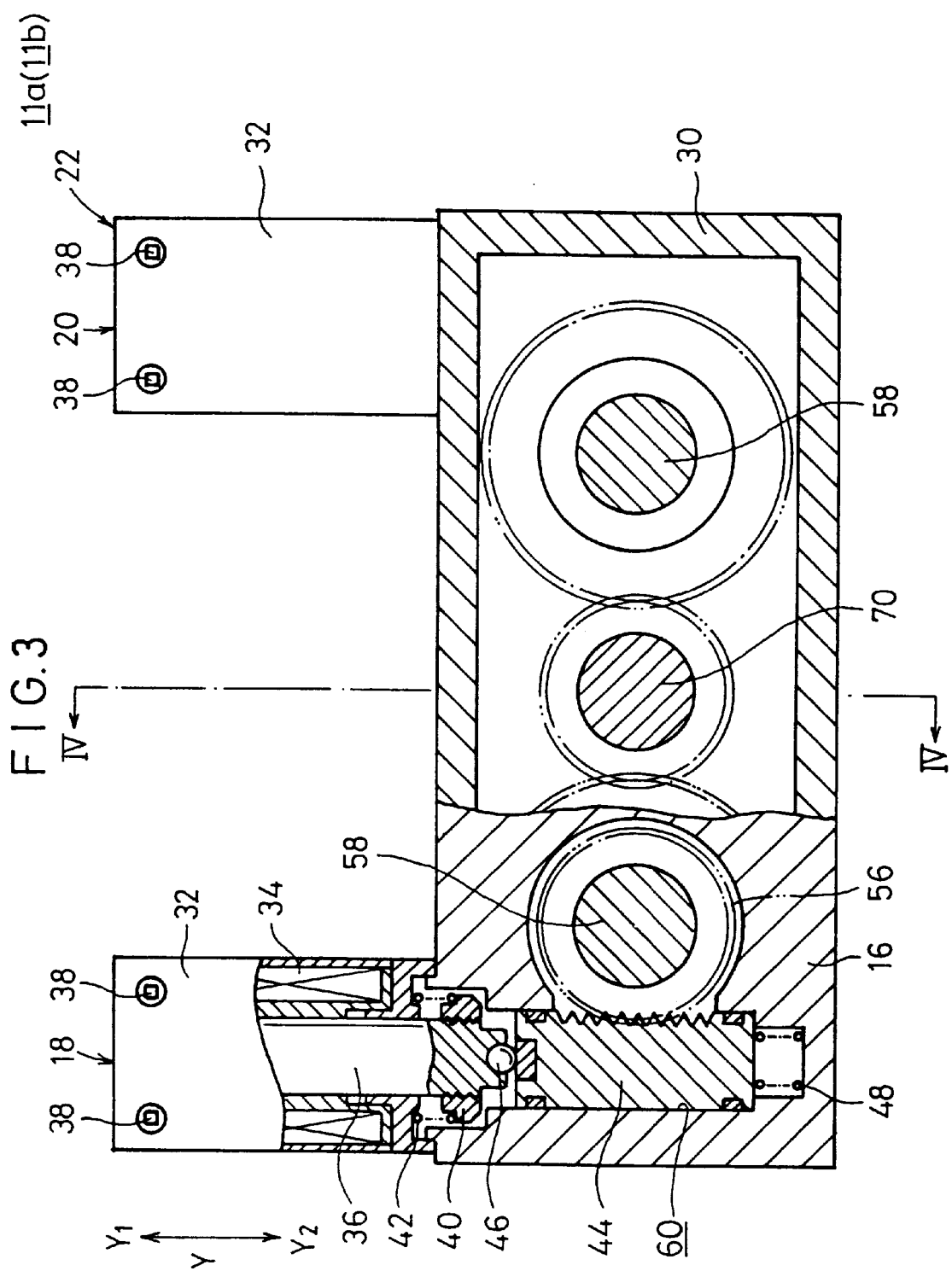
FIG. 3 shows a longitudinal sectional view taken along a line III—III shown in FIG. 2.

The first speed controller 11a (second speed controller 11b) includes a substantially rectangular parallelepiped-shaped body 16 formed with a first pressure fluid inlet/outlet port 12 and a second pressure fluid inlet/outlet port 14 (see FIG. 4), and a solenoid-operated valve section 22 comprising a pair of a first solenoid-operated valve 18 and a second solenoid-operated valve 20 juxtaposed on one side surface of the body 16 while being separated from each other by a predetermined spacing distance (see FIG. 3). In the following description, the apparatus will be explained on the basis of the first speed controller 11a, and the second speed controller 11b is omitted from explanation, because the first speed controller 11a is constructed in the same manner as the second speed controller 11b.

Figure 2:
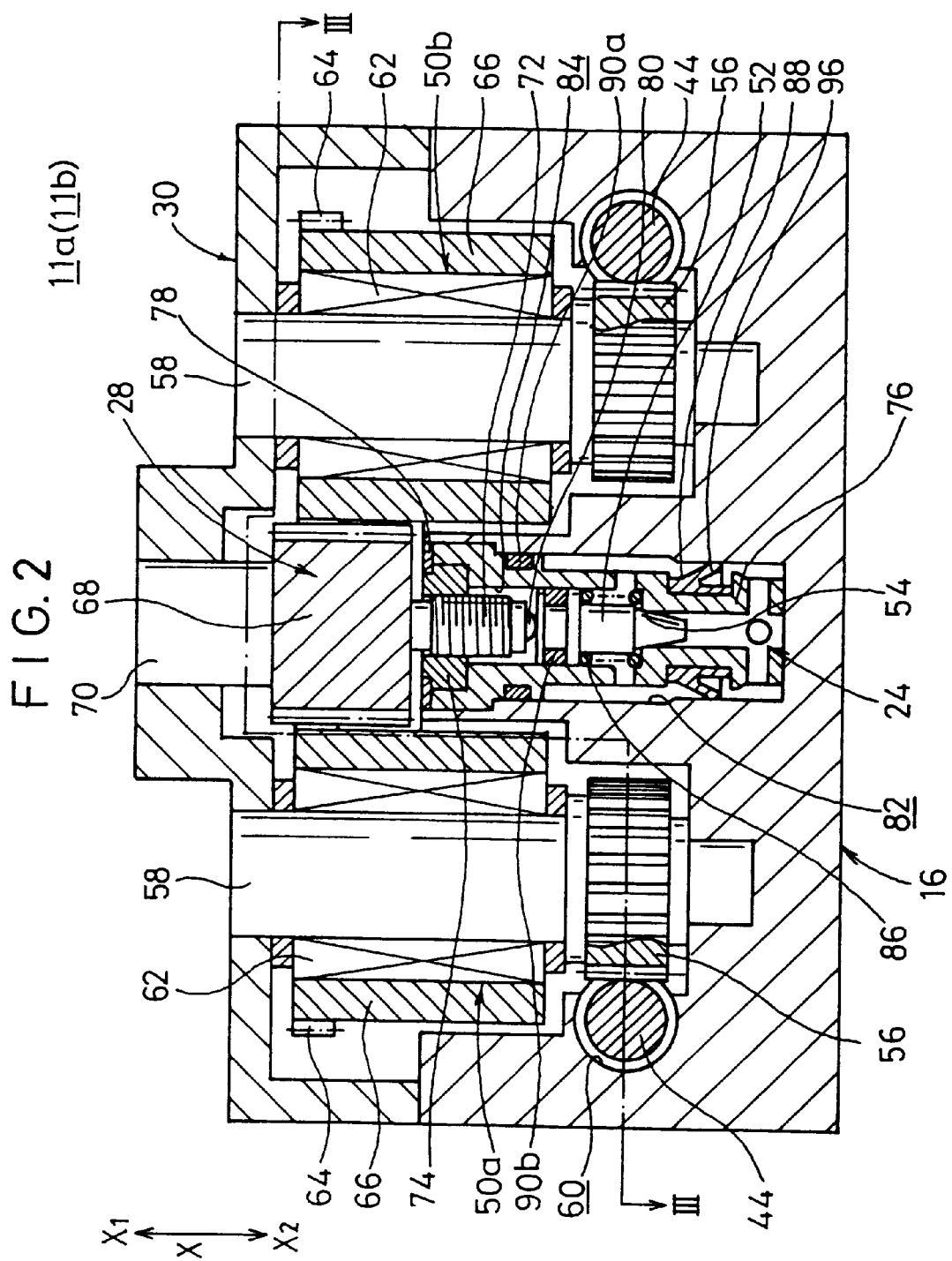
FIG. 2 shows a longitudinal sectional view illustrating a speed controller for constructing the speed control apparatus for the cylinder shown in FIG. 1.

As shown in FIG. 2, the first speed controller 11a (second speed controller 11b) comprises a throttle section 24 arranged at a substantially central portion of the body 16, for controlling the flow rate of the pressure fluid flowing from the second pressure fluid inlet/outlet port 14 to the first pressure fluid inlet/outlet port 12, a throttle amount control section 28 for controlling the throttle amount at the throttle section 24 in accordance with the driving action of the first solenoid-operated valve 18 or the second solenoid-operated valve 20 energized on the basis of the control signal outputted from the controller 15, and a cover member 30 provided at the upper surface of the body 16 and coupled to the body 16 in an integrated manner.

Figure 4:
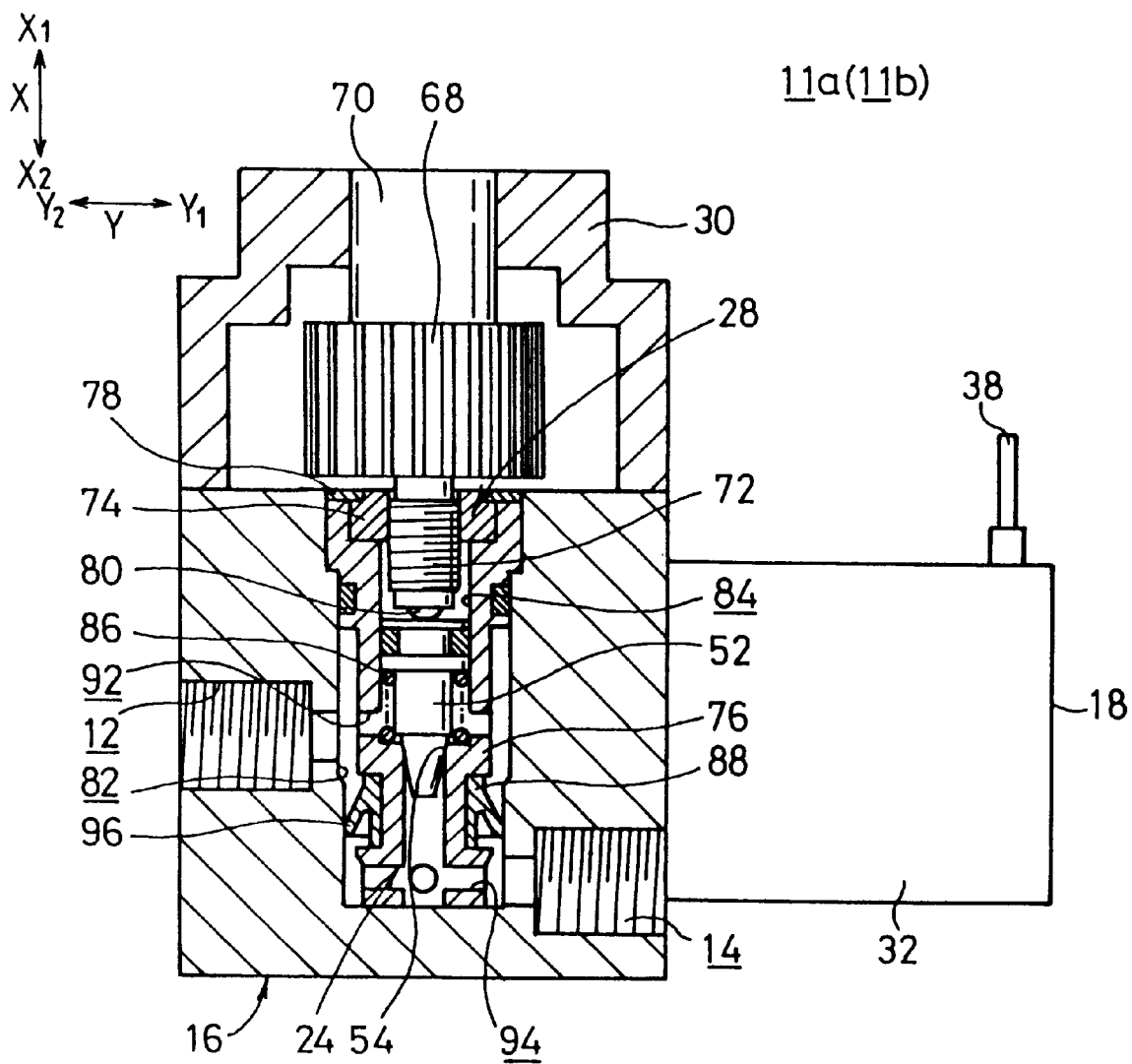
FIG. 4 shows a longitudinal sectional view taken along a line IV—IV shown in FIG. 3.

The first solenoid-operated valve 18 is constructed in the same manner as the second solenoid-operated valve 20. As shown in FIGS. 3 and 4, each of the first and second solenoid-operated valves 18, 20 comprises a housing 32 having a rectangular cross section, a coil section 34 arranged in the housing 32 and including a coil wound in a plurality of turns, a movable iron core 36 surrounded by the coil section 34 and provided displaceably in the direction of the arrow Y, and lead wires 38 for electrically connecting an unillustrated power source and the coil section 34.

As shown in FIG. 3, a spring member 42 is installed to the movable iron core 36 via a coupling member 40. The resilient force of the spring member 42 allows the movable iron core 36 to be in a state of being always pressed in the direction of the arrow $Y_2$. A ball member 46, which makes point-to-point contact with the first end of a rack 44 as described later on, is secured to the first end of the movable iron core 36. Reference numeral 48 indicates a spring member fastened to the second end of the rack 44.

As shown in FIG. 2, the throttle amount control section 28 is arranged mutually symmetrically while the throttle section 24 is disposed at the center. The throttle amount control section 28 has a first control mechanism 50a and a second control mechanism 50b each of which is composed of identical constitutive elements. The first control mechanism 50a functions to displace a valve plug 52 in a direction (direction of the arrow $X_2$) to make approach to a seat section 54 as described later on. On the other hand, the second control mechanism 50b functions to displace the valve plug 52 in a direction (direction of the arrow $X_1$) to make separation from the seat section 54. Explanation will be made below such that the same constitutive elements of the first control mechanism 50a as those of the second control mechanism 50b are designated by the same reference numerals.

As shown in FIGS. 2 and 3, the first control mechanism 50a (second control mechanism 50b) is formed to have a substantially columnar configuration, and it comprises the rack 44 for making abutment against the movable iron core 36 of the first solenoid-operated valve 18 via the ball member 46, a pinion 56 for meshing with teeth of the rack 44 to convert the rectilinear motion of the rack 44 into the rotary motion, and a shaft 58 coupled to the pinion 56 to make rotation. integrally with the pinion 56. The rack 44 is arranged slidably along a hole 60 having a circular cross section extending in a substantially horizontal direction with respect to the body 16. The teeth having a predetermined pitch are formed on the outer circumferential surface of the rack 44. Teeth for meshing with the teeth of the rack 44 are formed on the outer circumferential surface of the pinion 56.

As shown in FIG. 2, a one-way clutch 62 which functions to transmit the rotary force only when the shaft 58 is rotated in a predetermined first direction, and a driving gear 66 which comprises a meshing section 64 integrally formed at a step section on the upper side on the outer circumferential surface are coupled to the shaft 58 coaxially with the pinion 56. In this embodiment, only when the pinion 56 and the shaft 58 are integrally rotated in the predetermined first direction, the rotary force of the shaft 58 is transmitted via the one-way clutch 62 to the driving gear 66. On the other hand, when the pinion 56 and the shaft 58 are rotated in a direction different from the above, the rotary force of the shaft 58 is not transmitted to the driving gear 66.

As shown in FIG. 2, a driven gear 68, which has teeth formed on its outer circumferential surface for meshing with the meshing section 64 of the driving gear 66, is arranged at a substantially central portion of the body 16. A shaft section 70, which is rotatably supported in a hole of the cover member 30, is integrally coupled to the upper surface portion of the driven gear 68. A screw member 72, which is threaded with a thread on its outer circumferential surface, is integrally coupled to the bottom surface portion of driven gear 68. The screw member 72 is provided such that it is engaged with a screw hole formed on a hole of a ring-shaped bearing member 74. The bearing member 74 is held by a step section of a cylindrical member 76 as described later on, and it is prevented from disengagement by the aid of a ring member 78 fixed to the upper surface of the cylindrical member 76. The driven gear 68, the shaft section 70, and the screw member 72 function as displacement members to make displacement in an integrated manner.

In this embodiment, when the driven gear 68 is rotated in the predetermined distance. the shaft section 70 and the screw member 72 are rotated integrally with the driven gear 68. Therefore, the driven gear 68 is provided such that it is displaced in the vertical direction (direction of the arrow X) in accordance with the increase or decrease in screwing amount of the screw member 72 with respect to the screw hole of the bearing member 74. A ball member 80, which makes point-to-point contact with the valve plug 52, is secured to the first end of the screw member 72.

As shown in FIGS. 2 and 4, the throttle section 24 comprises the cylindrical member 76 fixed in a recess 82 of the body 16 by the aid of a step section, the valve plug 52 provided displaceably along a through-hole 84 formed in the cylindrical member 76, a spring member 86 having its first end fastened to an annular step section in the through-hole 84 and its second end fastened to an annular projection of the valve plug 52, and a check valve 88 installed to an annular groove formed on the outer circumferential surface of the cylindrical member 76. In this embodiment, the valve plug 52 is in a state of being always pressed upwardly (in the direction of the arrow $X_1$) in accordance with the action of the resilient force of the spring member 86. Reference numerals 90a, 90b indicate seal members installed to the cylindrical member 76 and the valve plug 52 respectively.

As shown in FIG. 4, the cylindrical member 76 is formed with a first hole 92 which is formed perpendicularly to the axis of the through-hole 84 and which functions as a passage to make communication between the first pressure fluid inlet/outlet port 12 and the through-hole 84, and a second hole 94 which functions as a passage for making communication between the second pressure fluid inlet/outlet port 14 and the through-hole 84.

The valve plug 52 has its first end which is formed to have a tapered cross section. When the first end of the valve plug 52 is seated on the seat section 54 formed on the inner wall surface of the cylindrical member 76, the through-hole 84 is closed. The valve plug 52 has its second end which is provided to make abutment against the screw member 72 of the driven gear 68 via the ball member 80 which makes the point-to-point contact.

Therefore, when the valve plug 52 is displaced downwardly integrally with the driven gear 68 against the resilient force of the spring member 86 in accordance with the rotary action of the driven gear 68, the spacing distance is decreased between the seat section 54 and the first end of the valve plug 52 having the tapered cross section with its diameter gradually reduced. Consequently, the first end of the valve plug 52 is seated on the seat section 54, and thus the through-hole 84 is closed. On the other hand, when the valve plug 52 is displaced upwardly integrally with the driven gear 68 in accordance with the resilient force of the spring member 86, the spacing distance is increased between the seat section 54 and the first end of the valve plug 52.

The check valve 88 is made of, for example, a flexible material such as rubber. The check valve 88 is formed with a lip section 96 which contacts with the inner wall surface of the recess 82 of the body 16 to prevent the pressure fluid from flowing from the second pressure fluid inlet/outlet port 14 to the first pressure fluid inlet/outlet port 12.

The speed control apparatus 10 for the cylinder according to the embodiment of the present invention is basically constructed as described above. Next, its operation, function, and effect will be explained below. At first, explanation will be made for a case in which the control is performed so that the piston 7 of the cylinder 2 is displaced at a constant displacement speed.

The pressure fluid (compressed air), which is supplied from the pressure fluid supply source 3, passes through the selector valve 13, and it is introduced into the recess 82 of the body 16 via the first pressure fluid inlet/outlet port 12 of the first speed controller 11a. The pressure fluid introduced into the recess 82 acts on the lip section 96 of the check valve 88 to separate it from the inner wall surface of the recess 82 and bent it inwardly. The pressure fluid passes through the gap between the lip section 96 and the inner wall surface, and it is discharged from the second pressure fluid inlet/outlet port 14 which communicates with the recess 82. Further, the pressure fluid passes through the port 4a, and it is supplied to the first cylinder chamber 99a of the cylinder 2. The piston 7 is displaced in the direction of the arrow B in accordance with the action of the pressure fluid supplied to the first cylinder chamber 99a.

The displacement amount of the piston 7 is detected by the sensor 19, and the detection signal is transmitted to the controller 15. The controller 15 compares the initially set displacement speed with the displacement speed calculated on the basis of the detection signal. The controller 15 provides the control signal to increase or decrease the throttle amount of the first speed controller 11a and/or the second speed controller 11b as described later on. Thus, the feedback control is effected so that the displacement speed of the piston 7 is within a previously set allowable range of the displacement speed.

During this process, the pressure fluid in the second cylinder chamber 99a is throttled to give a predetermined flow rate by the aid of the second speed controller 11b, and then it is discharged to the atmospheric air via the selector valve 13. That is, the pressure fluid, which is introduced into the second pressure fluid inlet/outlet port 14 of the second speed controller 11b, presses the lip section 96 of the check valve 88 toward the inner wall surface. Thus, the pressure fluid is prevented from flowing along the recess 82. The pressure fluid is fed to the selector valve 13 via the second hole 94, the through-hole 84, the first hole 92, and the first pressure fluid inlet/outlet port 12 which make communication with each other. During this process, the pressure fluid, which flows from the second hole 94 along the through-hole 84, is throttled to give a predetermined flow rate depending on the spacing distance between the first end of the valve plug 52 and the seat section 54. It is assumed that the throttle amount is previously set to be a predetermined throttle amount.

Subsequently, after the piston 7 arrives at the displacement terminal position, the valve position is changed in accordance with the changeover signal transmitted from the controller 15 to the selector valve 13. The pressure fluid, which is supplied from the pressure fluid supply source 3, passes through the selector valve 13, the second speed controller 11b, and the port 4b, and it is supplied to the second cylinder chamber 99b of the cylinder 2. The piston 7 is displaced in the direction (direction of the arrow A) opposite to the above, in accordance with the action of the pressure fluid. During this process, the pressure fluid in the first cylinder chamber 99a is throttled to give a predetermined flow rate by the aid of the first speed controller 11a, and then it is discharged to the atmospheric air via the selector valve 13.

Explanation will be made below for a case in which the displacement speed of the piston 7 of the cylinder 2 is controlled to be constant by increasing or decreasing the throttle amount by inputting the control signal into the first speed controller 11a and/or the second speed controller 11b when the meter-out control is effected by the first and second speed controllers 11a, 11b as described above.

Explanation will be made for the control of the throttle amount of the fist speed controller 11a, and explanation will be omitted for the second speed controller 11b, because the first and second speed controllers 11a, 11b are constructed in the same manner.

At first, explanation will be made for a case in which the throttle amount of the first speed controller 11a is increased. An ON signal and an OFF signal are transmitted from the controller 15 to the first solenoid-operated valve 18. The ON signal and the OFF signal may be either a single control signal or a plurality of control signals which are continuous.

The movable iron core 36 makes reciprocating motion by a minute distance on the basis of the ON signal and the OFF signal. The rectilinear reciprocating motion of the movable iron core 36 is transmitted to the rack 44 which constructs the first control mechanism 50*a*. The pinion 56, which is meshed with the rack 44, makes rotary motion by a predetermined angle in both forward and backward directions respectively on the basis of the reciprocating motion of the rack 44.

In this embodiment, only the rotary motion in one direction of either the forward direction or the backward direction is transmitted to the driving gear 66 in accordance with the action of the one-way clutch 62. The rotary motion of the driving gear 66 is transmitted via the meshing section 64 to the driven gear 68, and the driven gear 68 is rotated in the predetermined direction. The rotary motion of the driven gear 68 is converted into the rectilinear motion in accordance with the engaging action of the screw member 72 and the screw hole of the bearing member 74. Thus, the driven gear 68 is displaced downwardly (in the direction of the arrow $X_2$).

Therefore, the valve plug 52 is displaced downwardly against the resilient force of the spring member 86 by the aid of the screw member 72 which is displaced integrally with the driven gear 68 to decrease the spacing distance between the first end of the valve plug 52 and the seat section 54. As a result, the pressure fluid, which is introduced via the through-hole 84, is throttled for the flow rate to flow through the gap between the first end of the valve plug 52 and the seat section 54. Thus, the throttle amount is increased.

When the driven gear 68 is rotated in the predetermined direction in accordance with the rotary motion transmitted from the first control mechanism 50*a*, the driving gear 66, which constructs the second control mechanism 50*b*, makes idle running in accordance with the action of the one-way clutch 62. Therefore, the rotary motion is not transmitted from the first control mechanism 50*a* to the second control mechanism 50*b*.

Next, explanation will be made for a case in which the throttle amount of the first speed controller 11*a* is decreased. At first, an ON signal and an OFF signal are transmitted from the controller 15 to the second solenoid-operated valve 20. The ON signal and the OFF signal may be either a single control signal or a plurality of control signals.

The movable iron core 36 makes reciprocating motion by a minute distance on the basis of the ON signal and the OFF signal. The rectilinear reciprocating motion of the movable iron core 36 is transmitted to the rack 44 which constructs the second control mechanism 50*b*. The pinion 56, which is meshed with the rack 44, makes rotary motion by a predetermined angle in both forward and backward directions respectively on the basis of the reciprocating motion of the rack 44.

In this embodiment, only the rotary motion in one direction of either the forward direction or the backward direction is transmitted to the driving gear 66 in accordance with the action of the one-way clutch 62. The rotary motion of the driving gear 66 is transmitted via the meshing section 64 to the driven gear 68, and the driven gear 68 is rotated in the direction opposite to the predetermined direction described above. The rotary motion of the driven gear 68 is converted into the rectilinear motion in accordance with the engaging action of the screw member 72 and the screw hole of the bearing member 74. Thus, the driven gear 68 is displaced upwardly (in the direction of the arrow $X_1$).

Therefore, the valve plug 52 is displaced upwardly in accordance with the action of the resilient force of the spring member 86 by the aid of the screw member 72 which is displaced integrally with the driven gear 68 to increase the spacing distance between the first end of the valve plug 52 and the seat section 54. As a result, the pressure fluid, which is introduced via the through-hole 84 and which flows through the gap between the first end of the valve plug 52 and the seat section 54, has the increased flow rate. Thus, the throttle amount is decreased.

When the driven gear 68 is rotated in accordance with the rotary motion transmitted from the second control mechanism 50*b*, the driving gear 66, which constructs the first control mechanism 50*a*, makes idle running in accordance with the action of the one-way clutch 62. Therefore, the rotary motion is not transmitted from the second control mechanism 50*b* to the first control mechanism 50*a*.

The throttle amount of the second speed controller 11*b* is increased or decreased in the same manner as in the first speed controller 11*a*.

As described above, the control signal outputted from the controller 15 is used to energize or deenergize the first solenoid-operated valve 18 or the second solenoid-operated valve 20 of the first speed controller 11*a* and/or the second speed controller 11*b* so that the spacing distance between the valve plug 52 and the seat section 54 may be conveniently increased or decreased by the aid of the first control mechanism 50*a* or the second control mechanism 50*b* driven by the first solenoid-operated valve 18 or the second solenoid-operated valve 20.

The throttle amount of the first speed controller 11*a* and/or the second speed controller 11*b* is adjusted on the basis of the detection signal inputted from the sensor 19 into the controller 15. That is, the controller 15 compares the actual displacement speed of the piston 7 calculated on the basis of the detection signal from the sensor 19 with the initially set displacement speed of the piston 7. Further, the controller 15 transmits the control signal to the first speed controller 11*a* and/or the second speed controller 11*b* to control the throttle amount so that the actual displacement speed of the piston 7 is within the initially set allowable range. As a result, as shown in FIG. 6, the control is made such that the displacement speed of the piston 7 of the cylinder 2 is constant.

Figure 5:
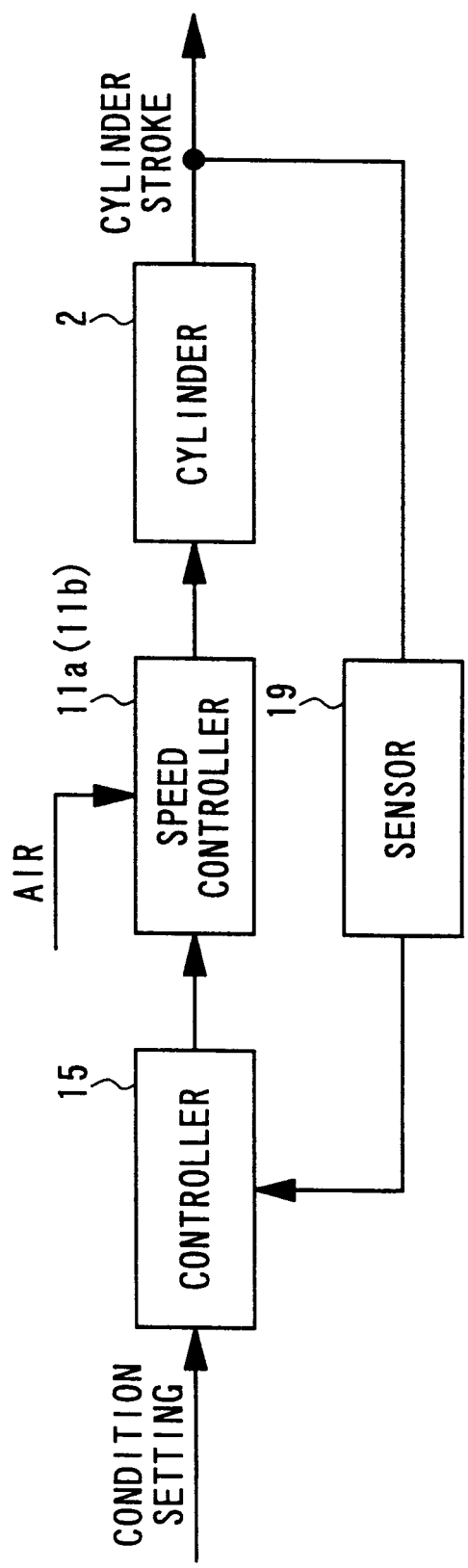
FIG. 5 shows a block diagram to be used to illustrate the operation of the speed control apparatus for the cylinder shown in FIG. 1.

As shown in FIG. 5, the throttle amount of the first speed controller 11*a* and/or the second speed controller 11*b* is changed on the basis of the control signal transmitted from the controller 15 to make feedback control for the displacement speed of the piston 7. Thus, the displacement speed of the piston 7 can be automatically controlled to be a desired speed. Therefore, the maintenance operation is simplified. Further, the throttle amounts of a large number of speed controllers connected to the controller 15 can be collectively adjusted by means of remote control.

Figure 6:
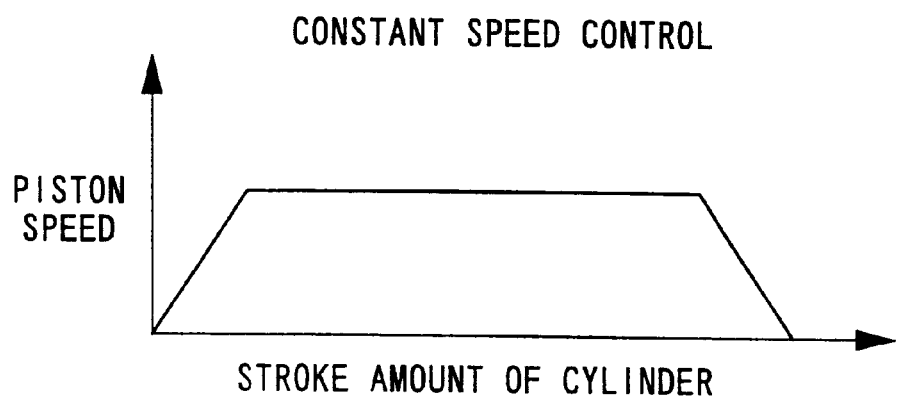
FIG. 6 illustrates the relationship between the speed and the stroke amount, obtained when the displacement speed of the piston of the cylinder is controlled to be a constant speed.
Figure 7:
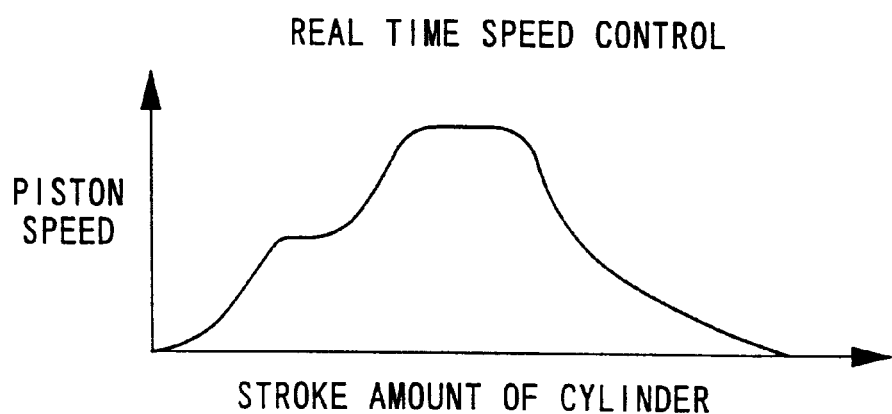
FIG. 7 illustrates the relationship between the speed and the stroke amount, obtained when the displacement speed of the piston of the cylinder is controlled in real time.
Figure 8:
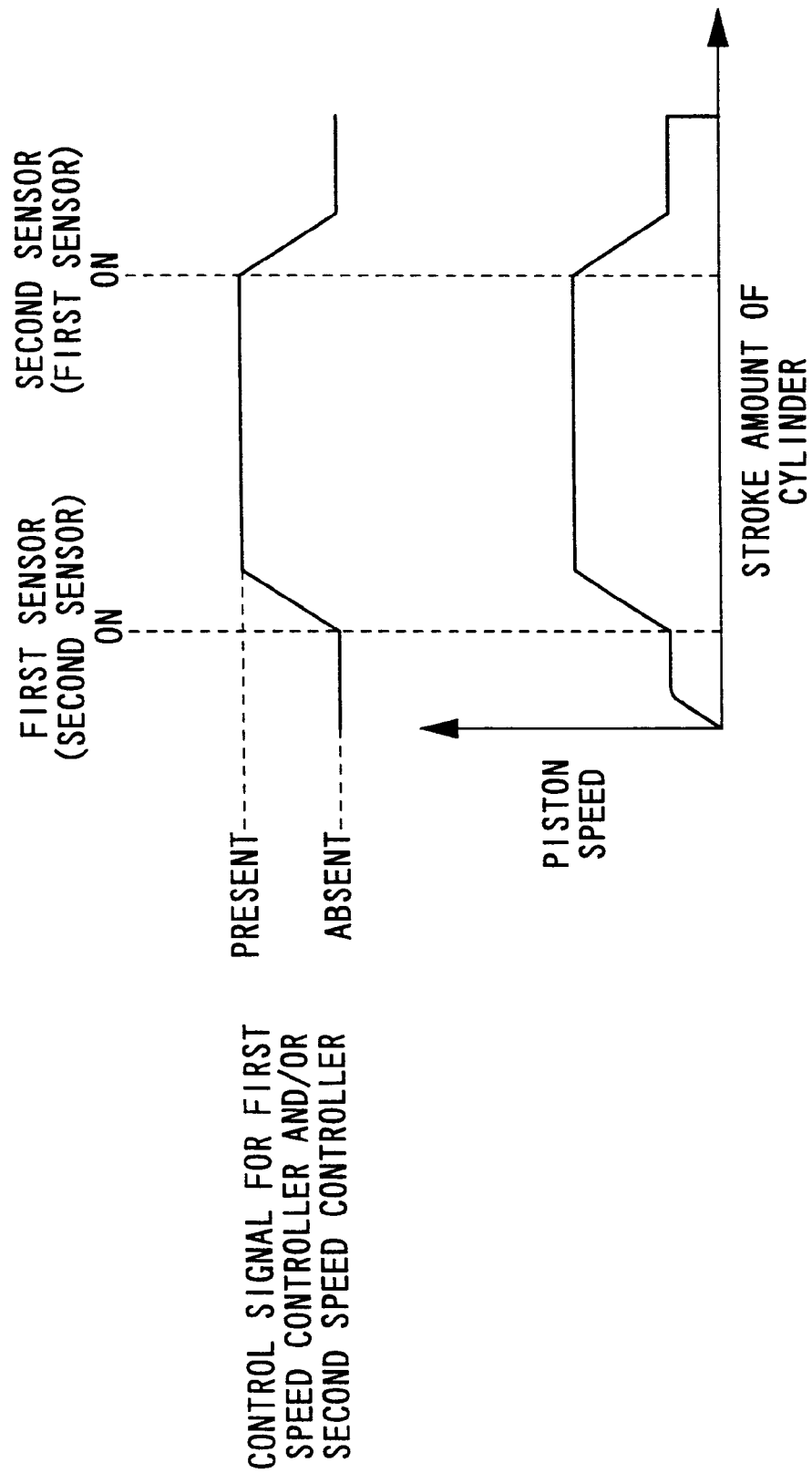
FIG. 8 illustrates the relationship between the speed and the stroke amount, obtained when the displacement speed of the piston of the cylinder is controlled in multiple stages.

In this embodiment, the control of the displacement speed of the piston 7 of the cylinder 2 is not limited to the constant speed control as shown in FIG. 6. Alternatively, the speed control may be performed in real time as shown in FIG. 7. Further alternatively, as shown in FIG. 8, the displacement speed of the piston 7 may be controlled in multiple stages by using two sensors including an unillustrated first sensor arranged on one end side of the cylinder 2 and an unillustrated second sensor arranged on the other side thereof. In the case of the multiple stage control described above, it is a matter of course that the feedback control is effected on the basis of detection signals outputted from the first sensor and the second sensor respectively. It is noted that each of the first and second speed controllers 11*a*, 11*b* has the selfholding function, because the valve plug 52 is held at the predetermined position when no electric power is applied to the first solenoid-operated valve 18 or the second solenoid-operated valve 20.

The ON signal and the OFF signal, which are inputted into the first solenoid-operated valve 18 or the second solenoid-operated valve 20, can be used to set or adjust the throttle amount, and it is unnecessary to use, for example, any amplifier for the driving operation. Thus, it is possible to reduce the production cost.

Figure 9:
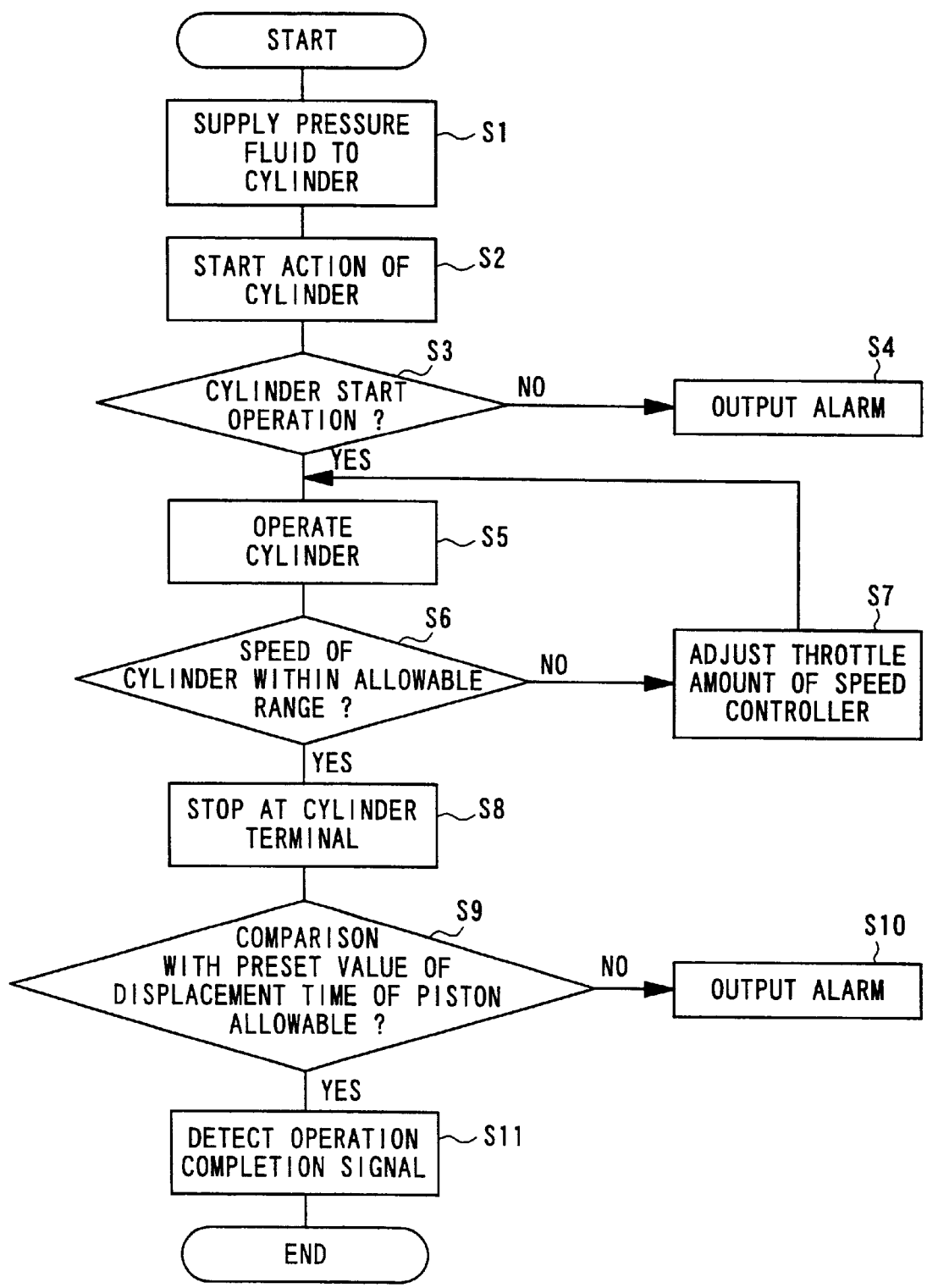
FIG. 9 shows a flow chart illustrating a case in which an alarm signal is outputted from the controller.

Explanation will now be made with reference to a flow chart shown in FIG. 9 for a case in which the actual displacement speed of the piston 7 calculated on the basis of the detection signal from the sensor 19 is compared with the initially set displacement speed of the piston 7 so that an alarm signal is outputted from the controller 15 if the actual displacement speed of the piston 9 is not within the initially set allowable range.

At first, the pressure fluid is supplied to the cylinder 2 in accordance with the energizing action of the pressure fluid supply source 3 (step S1). The piston 7 of the cylinder 2 starts the displacement action in the predetermined direction in accordance with the action of the supplied pressure fluid (step S2). The controller 15 confirms whether or not the piston 7 starts the displacement action on the basis of the detection signal outputted from the sensor 19 (step S3). If the piston 7 does not starts the displacement action, the controller 15 outputs an alarm signal to another unillustrated apparatus (step S4). The operator can recognize the fact that the cylinder 2 is not operated, for example, by the aid of an alarm sound or emitted light of LED which emits light on the basis of the alarm signal.

After the cylinder 2 is operated, the controller 15 calculates the displacement speed of the piston 7 on the basis of the displacement amount of the piston 7 detected by the sensor 19 to judge whether or not the displacement speed is within the initially set allowable range of the displacement speed of the piston 7 (steps S5, S6). If the displacement speed of the piston 7 is not within the allowable range, the controller 15 inputs the control signal into the first speed controller 11a and/or the second speed controller 11b to adjust the throttle amount of the first speed controller 11a and/or the second speed controller 11b so that the displacement speed of the piston 7 is within the allowable range (step S7).

If the displacement speed of the piston 7 is within the allowable range, the controller 15 recognizes the fact that the piston 7 arrives at the displacement terminal position on the basis of the detection signal detected by the sensor 19 (step S8). Further, the controller 15 judges whether or not the actual displacement time required from the start of the piston 7 to the arrival at the displacement terminal position is within the previously set allowable range of the displacement time (step S9).

If the actual displacement time of the piston 7 is not within the previously set allowable range of the displacement time, in other words, if the piston 7 arrives at the displacement terminal position earlier then the previously set displacement time, and if the piston 7 arrives at the displacement terminal position later then the previously set displacement time, then the controller 15 outputs the alarm signal (step S10).

On the other hand, if the actual displacement time of the piston 7 is within the pervasively set allowable range of the displacement time, the controller 15 outputs an operation completion signal (step S11).

As described above, the operator can conveniently recognize whether or not the displacement speed of the piston 7 of the cylinder 2 is normally controlled, on the basis of the alarm signal outputted from the controller 15.

Figure 10:
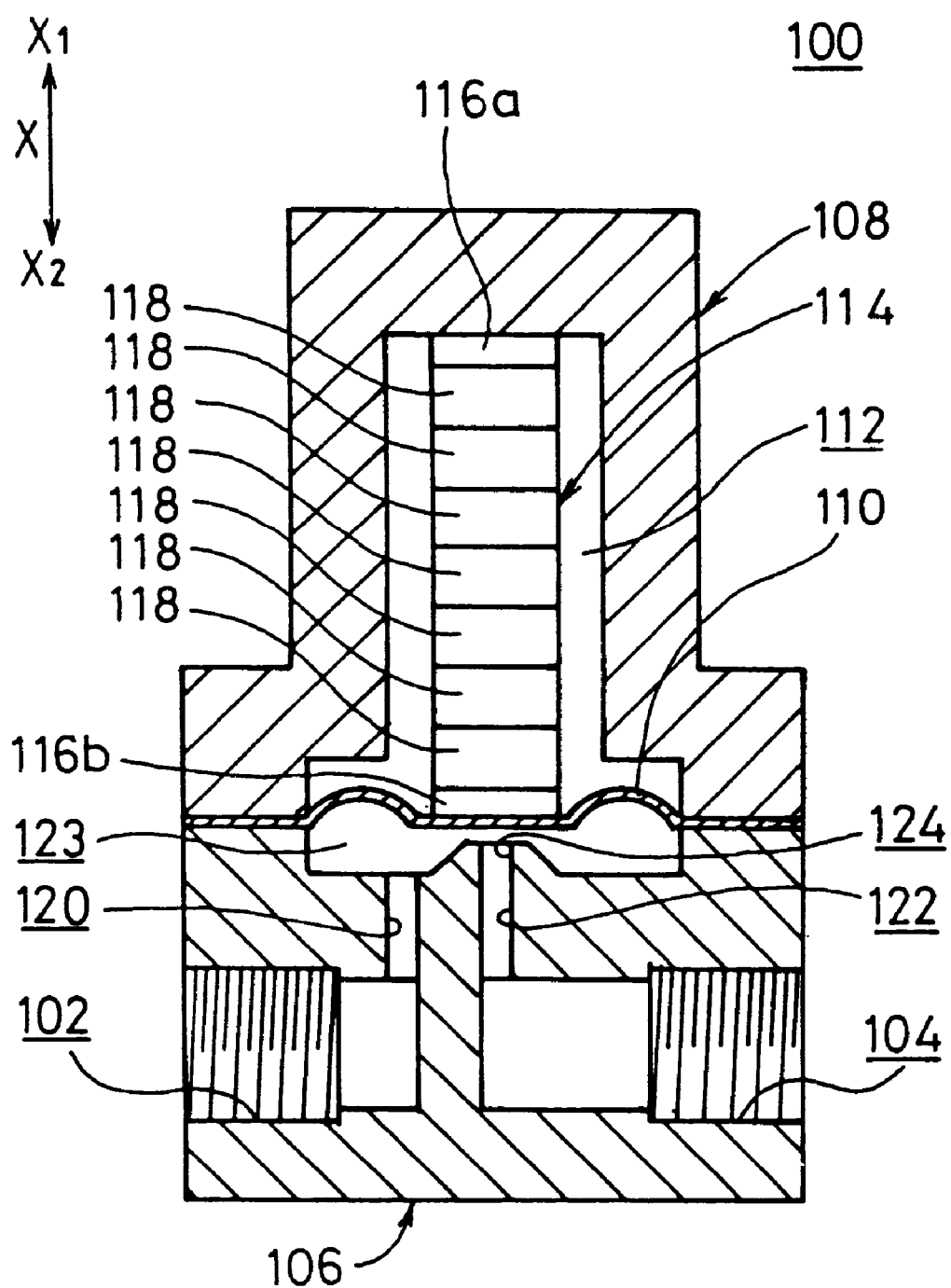
FIG. 10 shows a longitudinal sectional view illustrating a speed controller according to a modified embodiment.

Next, FIG. 10 shows a speed controller 100 according to a modified embodiment in which the arrangement of the throttle section is different from the above.

The speed controller 100 comprises a body 106 formed with a first pressure fluid inlet/outlet port 102 and a second pressure fluid inlet/outlet port 104, a bonnet 108 integrally coupled to the body 106, and a diaphragm 110 interposed between the body 106 and the bonnet 108.

A chamber 112, which is closed by the diaphragm 110, is formed at the inside of the bonnet 108. A stacked type electrostrictive element 114 is arranged in the chamber 112. The electrostrictive element 114 comprises a pair of w insulative members 116a, 116b provided at uppermost and lowermost sections, and a plurality of sintered members 118 stacked between the pair of insulative members 116a, 116b. A pair of unillustrated external electrodes are installed to both side surfaces of the electrostrictive element 114. The external electrodes are connected to the controller 15 via unillustrated lead wires. Unillustrated internal electrodes, which are formed to have a comb-shaped configuration, are formed between the plurality of adjoining sintered members 118. In this embodiment, the first end of the electrostrictive element 114 is secured to the ceiling of the bonnet 108, and the second end thereof is secured to the upper surface of the diaphragm 110.

A diaphragm chamber 123, which communicates with the first pressure fluid inlet/outlet port 102 and the second pressure fluid inlet/outlet port 104 via a first passage 120 and a second passage 122, is formed under the diaphragm 110. A nozzle hole 124, which communicates with the second passage 122, is formed under a central portion of the diaphragm 110. The throttle amount is set for the pressure fluid flowing through the gap between the nozzle hole 124 and the diaphragm 110.

The speed controller 100 according to the modified embodiment is basically constructed as described above. Next, its operation, function and effect will be explained.

The pressure fluid (compressed air), which is supplied from the first pressure fluid inlet/outlet port 102, passes through the first passage 120, and it is introduced into the diaphragm chamber 123. The pressure fluid, which is introduced into the diaphragm chamber 123, is throttled to give a predetermined flow rate in accordance with the spacing distance between the diaphragm 110 and the nozzle hole 124. After that, the pressure fluid is discharged and led, for example, to a pressure fluid-driven apparatus such as the cylinder 2 via the second passage 122 and the second pressure fluid inlet/outlet port 104 communicating with the nozzle hole 124.

When the throttle amount of the pressure fluid is increased or decreased, the control signal is fed from the controller 15 to the electrostrictive element 114. In the electrostrictive element 114, the current flows through the internal electrodes between the stacked sintered members 118 via the unillustrated external electrodes. Thus, an electric field is generated. The plurality of stacked sintered members 118 are expanded in accordance with the action of the electric field. Accordingly, the diaphragm 110, which is secured to the first end of the electrostrictive element 114, is bent toward the nozzle hole 124.

Therefore, the electrostrictive element 114 makes extension and contraction in the direction of the arrow X on the basis of the control signal fed from the controller 15. Thus, it is possible to increase or decrease the spacing distance between the diaphragm 110 and the nozzle hole 124. As a result, the throttle amount can be conveniently adjusted by using the control signal fed from the controller 15.

The use of the electrostrictive element 114 makes it possible to improve the response speed and adjust the throttle amount even when the piston 7 of the cylinder 2 is displaced in the predetermined direction. Further, the flow rate can be controlled for any one of the pressure fluid flowing from the first pressure fluid inlet/outlet port 102 to the second pressure fluid inlet/outlet port 104, and the pressure fluid flowing in the direction opposite to the above, i.e., from the second pressure fluid inlet/outlet port 104 to the first pressure fluid inlet/outlet port 102. The electrostrictive element 114 can be produced by using the semiconductor production technique. Therefore, the electrostrictive element 114 is advantageous in that it can be produced highly accurately in mass production as well.

Figure 11:
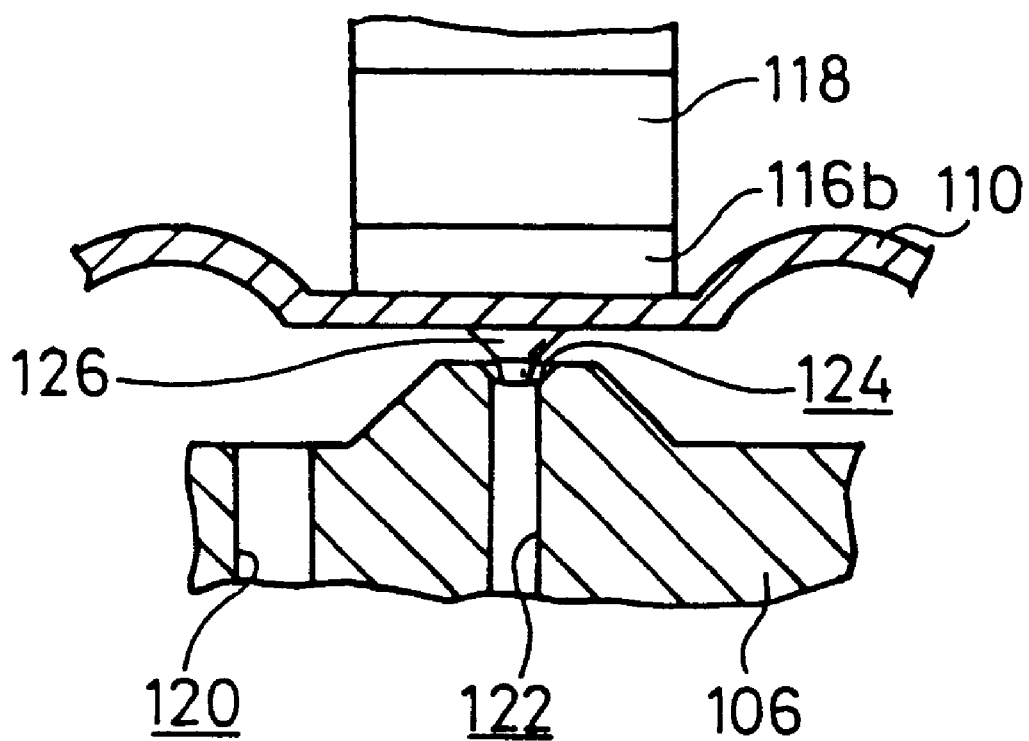
FIG. 11 shows a partial sectional view illustrating a projection secured to a diaphragm of the speed controller shown in FIG. 10.

As shown in FIG. 11, the apparatus may be constructed such that a projection 126 having a tapered cross section to be inserted along the nozzle hole 124 is secured to the bottom surface of the diaphragm 110. The provision of the projection 126 makes it possible to highly accurately control the throttle amount of the pressure fluid.

Figure 12:
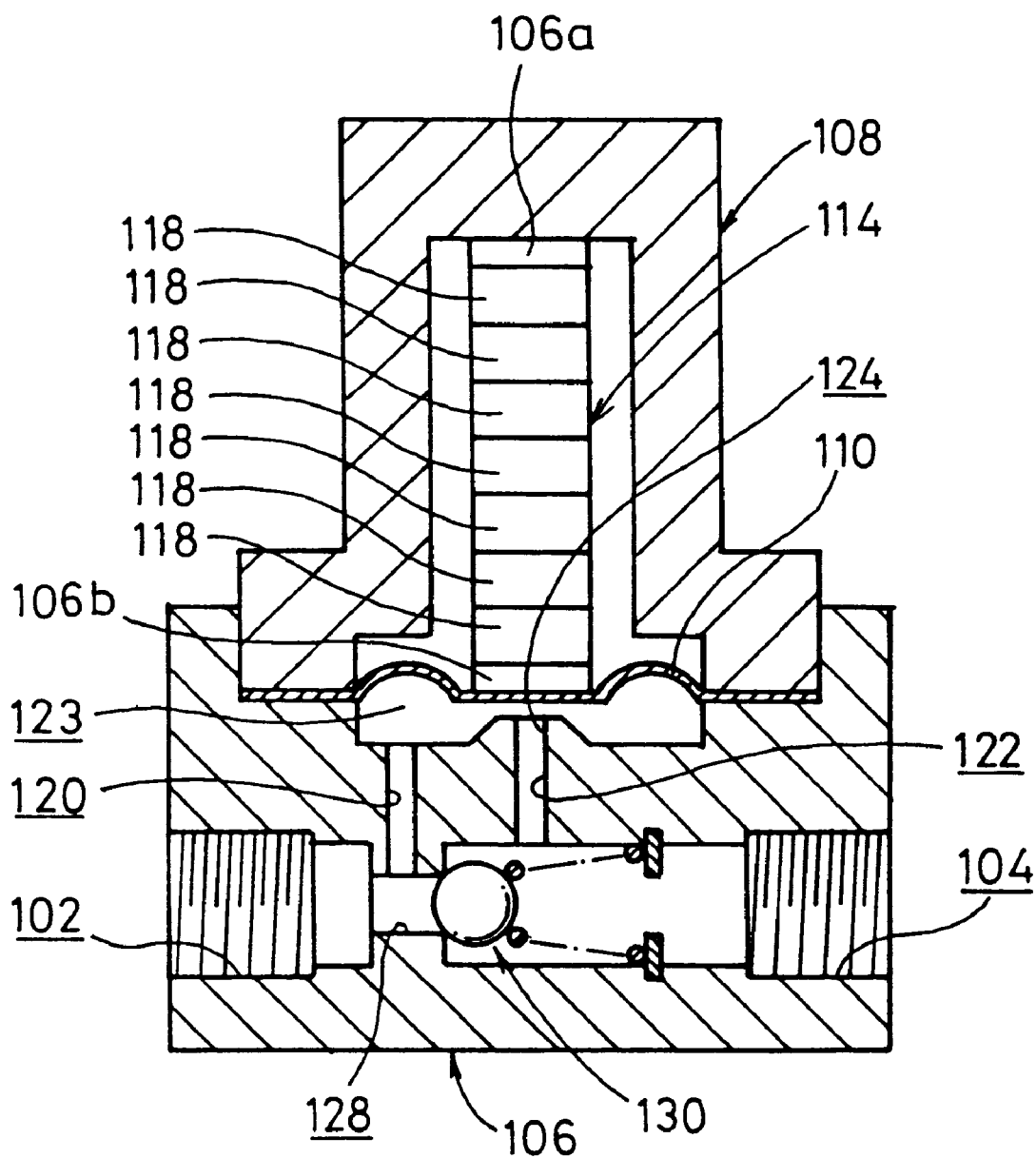
FIG. 12 shows a longitudinal sectional view illustrating a speed controller according to another modified embodiment.

As shown in FIG. 12, a communication passage 128 is formed to make communication between the first pressure fluid inlet/outlet port 102 and the second pressure fluid inlet/outlet port 104. A check valve 130 is arranged to prevent the pressure fluid from flowing from the second pressure fluid inlet/outlet port 104 to the first pressure fluid inlet/outlet port 102. Thus, it is possible to control the throttle amount of the pressure fluid flowing in only one direction.

The throttle amount can be also controlled by using, for example, a variety of unillustrated electric motors such as a voice coil type linear actuator and a stepping motor, in place of the electrostrictive element 114.

What is claimed is:

1. A speed control apparatus for a cylinder comprising:
   said cylinder;
   a speed controller installed to a port of said cylinder, for controlling a flow rate of a pressure fluid introduced into and discharged from a cylinder chamber;
   a controller for outputting a control signal to said speed controller; and
   a sensor for detecting a displacement amount of a piston of said cylinder and transmitting a detection signal to said controller, said controller comparing a preset displacement speed with a displacement speed calculated on the basis of said detection signal detected by said sensor wherein said speed controller includes:
   a body formed with a fluid passage for making communication between a first pressure fluid inlet/outlet port and a second pressure fluid inlet/outlet port;
   a throttle section for controlling said flow rate of said pressure fluid flowing through said fluid passage; and
   a throttle amount control section for changing a throttle amount at said throttle section on the basis of said control signal transmitted from said controller.

2. The apparatus according to claim 1, wherein said controller transmits said control signal to said speed controller to increase or decrease said throttle amount so that said actual displacement speed is within an allowable range of said preset displacement speed.

3. The apparatus according to claim 2, wherein said controller transmits an alarm signal if said actual displacement speed is not within said allowable range of said preset displacement speed.

4. The apparatus according to claim 1, wherein said throttle amount control section comprises a first control mechanism which is driven on the basis of an ON signal and is an OFF signal inputted into a first solenoid-operated valve, for increasing said throttle amount in said throttle section, and a second control mechanism which is driven on the basis of an ON signal and an OFF signal inputted into a second solenoid-operated valve, for decreasing said throttle amount in said throttle section.

5. The apparatus according to claim 4, wherein said first control mechanism comprises a rack to which reciprocating rectilinear motion of a movable iron core of said first solenoid-operated valve is transmitted, a pinion which meshes with said rack to convert rectilinear motion into rotary motion, and a displacement member which is displaceable in an axial direction in accordance with transmission of said rotary motion by the aid of a driving gear coaxial with said pinion, and wherein a valve plug is pressed against resilient force of a spring member in accordance with an displacement action of said displacement member so that a spacing distance between said valve plug and a seat section is decreased.

6. The apparatus according to claim 4, wherein said second control mechanism comprises a rack to which reciprocating rectilinear motion of a movable iron core of said second solenoid-operated valve is transmitted, a pinion which meshes with said rack to convert rectilinear motion into rotary motion, and a displacement member which is displaceable in an axial direction in accordance with transmission of said rotary motion by the aid of a driving gear coaxial with said pinion, and wherein a valve plug is displaced in a direction to make separation from a seat section by the aid of resilient force of a spring member in accordance with an displacement action of said displacement member so that a spacing distance between said valve plug and said seat section is increased.

7. The apparatus according to claim 5, further comprising a one-way clutch interposed between said pinion and said driving gear, for transmitting only rotary motion in one direction of said pinion to said driving gear.

8. The apparatus according to claim 6, further comprising a one-way clutch interposed between said pinion and said driving gear, for transmitting only rotary motion in one direction of said pinion to said driving gear.

9. The apparatus according to claim 1, wherein:
   said throttle section comprises a nozzle hole for making communication with said fluid passage, and a diaphragm for controlling a flow rate of said pressure fluid flowing through said nozzle hole depending on a spacing distance between said diaphragm and said nozzle hole;
   said throttle amount control section comprises an electrostrictive/piezoelectric member for displacing said diaphragm; and
   said spacing distance between said diaphragm and said nozzle hole is adjusted by applying electric power to said electrostrictive/piezoelectric member to expand said electrostrictive/piezoelectric member.

10. The apparatus according to claim 9, wherein a projection having a tapered cross section is provided on a lower surface of said diaphragm facing to said nozzle hole.

11. The apparatus according to claim 1, wherein said speed controller comprises a first speed controller installed to a first port of said cylinder, and a second speed controller installed to a second port of said cylinder.

12. The apparatus according to claim 1, wherein said controller inputs control signals into a large number of speed controllers installed to a plurality of cylinders, and thus trottle amounts of said respective speed controllers are collectively controlled by means of remote control.

* * * * *